(12) United States Patent
Takeda et al.

(10) Patent No.: US 11,277,060 B2
(45) Date of Patent: Mar. 15, 2022

(54) ALIGNING APPARATUS AND METHOD OF MANUFACTURING ALIGNED COIL

(71) Applicant: DENSO CORPORATION, Kariya (JP)

(72) Inventors: Hiroaki Takeda, Kariya (JP); Hiroki Fujita, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 16/850,435

(22) Filed: Apr. 16, 2020

(65) Prior Publication Data
US 2020/0343797 A1    Oct. 29, 2020

(30) Foreign Application Priority Data

Apr. 25, 2019 (JP) .............................. JP2019-084668

(51) Int. Cl.
| | | |
|---|---|---|
| *B23P 19/00* | (2006.01) | |
| *H02K 15/04* | (2006.01) | |
| *H02K 15/06* | (2006.01) | |

(52) U.S. Cl.
CPC ....... *H02K 15/0414* (2013.01); *H02K 15/064* (2013.01); *Y10T 29/49009* (2015.01); *Y10T 29/53143* (2015.01)

(58) Field of Classification Search
CPC .... H02K 15/0428; H02K 3/12; H02K 15/064; H02K 15/0056; H02K 15/085; Y10T 29/49009; Y10T 29/49012; Y10T 29/49073; Y10T 29/53143
USPC ......... 29/732, 596, 597, 598, 605, 606, 745, 29/760, 761, 840
See application file for complete search history.

(56) References Cited

U.S. PATENT DOCUMENTS

| | | | |
|---|---|---|---|
| 6,910,257 B1 * | 6/2005 | Gorohata | H02K 15/0428 242/599.1 |
| 8,384,263 B2 | 2/2013 | Hiramatsu et al. | |
| 10,742,101 B2 * | 8/2020 | Ohno | H02K 15/064 |

FOREIGN PATENT DOCUMENTS

| | | |
|---|---|---|
| JP | 2004-173357 A | 6/2004 |
| JP | 2004-312946 A | 11/2004 |
| JP | 2013-165540 A | 8/2013 |
| JP | 2015-198563 A | 11/2015 |
| JP | 6458637 B2 | 1/2019 |

* cited by examiner

*Primary Examiner* — Thiem D Phan
(74) *Attorney, Agent, or Firm* — Oliff PLC

(57) ABSTRACT

An aligning apparatus is provided for aligning coil segments in an annular shape to form an aligned coil. Each of the coil segments has a pair of first and second leg portions. The aligning apparatus includes an outer jig and an inner jig. The outer jig has partitioning members arranged in a radial fashion. The partitioning members are spaced at such intervals as to allow each of the first leg portions of the coil segments to be inserted between one circumferentially-adjacent pair of the partitioning members. The inner jig has hole-forming members arranged radially inside the partitioning members of the outer jig. Each of the hole-forming members has formed therein a hole in which one of the second leg portions of the coil segments is to be inserted. Moreover, the hole-forming members are configured to be rotatable relative to the outer jig in a circumferential direction and radially movable.

7 Claims, 15 Drawing Sheets

1ST CIRCUMFERENTIAL SIDE ←⎯⎯→ 2ND CIRCUMFERENTIAL SIDE

ALIGNING APPARATUS AND METHOD OF MANUFACTURING ALIGNED COIL

CROSS-REFERENCE TO RELATED APPLICATION

This application is based on and claims priority from Japanese Patent Application No. 2019-084668 filed on Apr. 25, 2019, the contents of which are hereby incorporated by reference in their entirety into this application.

BACKGROUND

1 Technical Field

The present disclosure relates to an aligning apparatus for forming an aligned coil and a method of manufacturing the aligned coil using the aligning apparatus.

2 Description of Related Art

There are known rotating electric machines such as motor-generators used in electric vehicles. These rotating electric machines have a stator that includes an aligned coil formed of a plurality of coil segments (or electrical conductor segments). In manufacturing the stator, the coil segments are aligned in an annular shape to form the aligned coil; then the aligned coil is assembled into slots of a stator core. In addition, the aligned coil is also referred to as a temporarily-assembled coil.

SUMMARY

According to the present disclosure, there is provided an aligning apparatus for aligning a plurality of coil segments in an annular shape to form an aligned coil. Each of the coil segments is substantially U-shaped to have a pair of first and second leg portions extending parallel to each other and a connecting portion that connects the first and second leg portions. The aligning apparatus includes an outer jig and an inner jig. The outer jig has a plurality of partitioning members arranged in a radial fashion. The partitioning members are spaced at such intervals as to allow each of the first leg portions of the coil segments to be inserted between one circumferentially-adjacent pair of the partitioning members. The inner jig has a plurality of hole-forming members arranged radially inside the partitioning members of the outer jig. Each of the hole-forming members has formed therein a hole in which one of the second leg portions of the coil segments is to be inserted. Moreover, the hole-forming members of the inner jig are configured to be rotatable relative to the outer jig in a circumferential direction and radially movable.

According to the present disclosure, there is also provided a method of manufacturing an aligned coil as described above using the aligning apparatus. This method includes the steps of: setting a radial position of the hole-forming members of the inner jig by radially moving the hole-forming members to positions where the second leg portions of the coil segments are to be respectively located during formation of the aligned coil; inserting the first and second leg portions of one of the coil segments respectively into a space between one circumferentially-adjacent pair of the partitioning members of the outer jig and the hole of one of the hole-forming members of the inner jig; rotating both the outer jig and the inner jig in a same direction by a same rotation angle; rotating, after performing the inserting step and the preceding rotating step for all the coil segments, the outer jig and the inner jig relative to each other, causing the first leg portions of the coil segments inserted between the partitioning members of the outer jig to be moved radially inward along the partitioning members; and pressing, after the first leg portions of the coil segments have been moved to the radially inner side of the partitioning members of the outer jig, the coil segments to cause the first leg portions of the coil segments to approach the hole-forming members of the inner jig, thereby aligning the coil segments in an annular shape to form the aligned coil.

DESCRIPTION OF EMBODIMENTS

Figure 1:
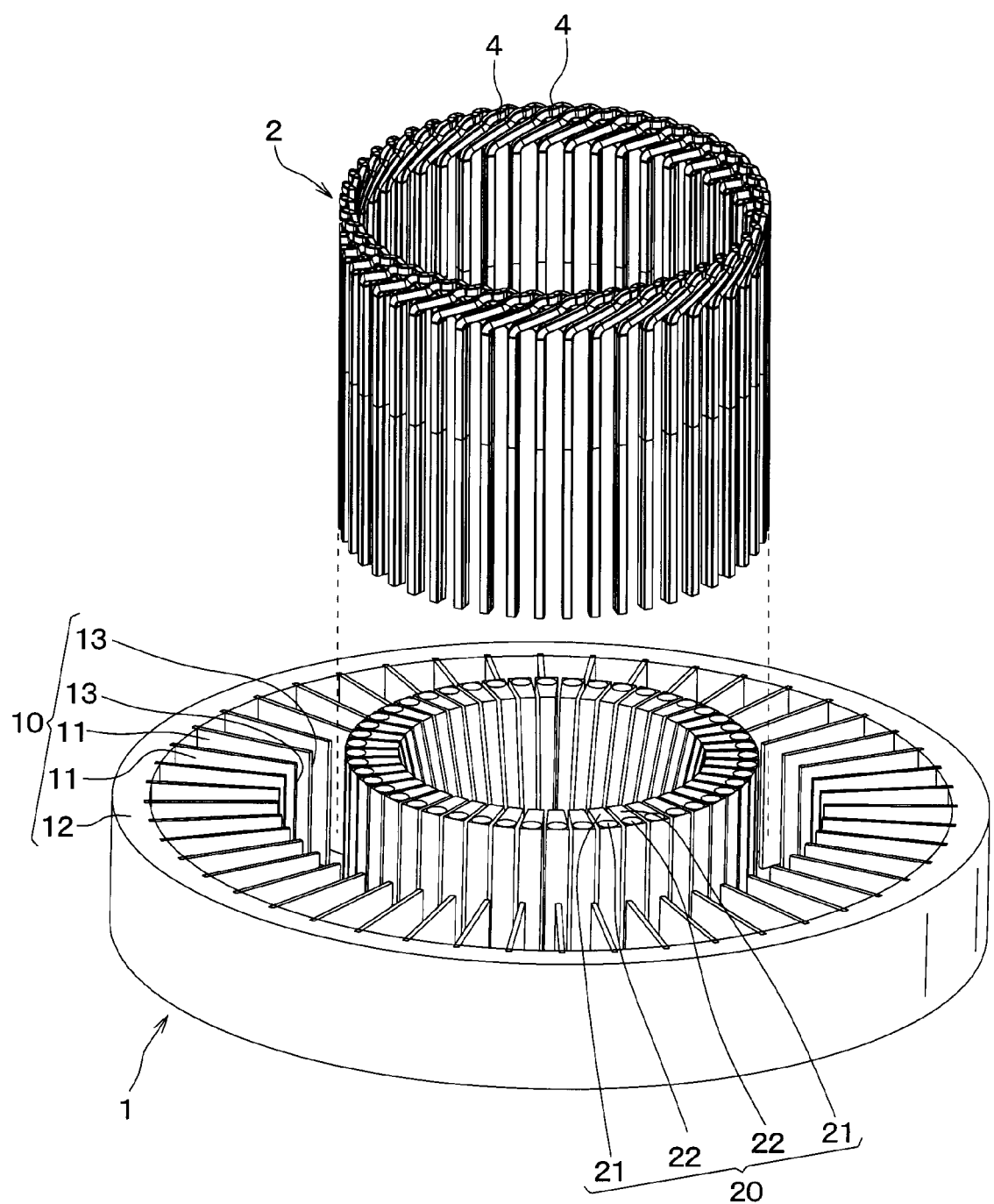
FIG. 1 is a perspective view of an aligning apparatus according to a first embodiment and an aligned coil formed with the aligning apparatus.

There is known an aligning apparatus for forming an aligned coil having a predetermined diameter (see, for example, Japanese Patent Application Publication No. JP 2013-165540 A). After being formed with the aligning apparatus, the aligned coil is removed from the aligning apparatus, combined with other aligned coils having different diameters from the aligned coil, and assembled into slots of a stator core.

The diameters of the aligned coils, which are together assembled into the slots of the stator core, gradually increase from a radially inner side to a radially outer side in the slots. However, the known aligning apparatus is configured to form only aligned coils having the predetermined diameter. Therefore, to form the aligned coils of a given stator which have different diameters, it is necessary to employ a plurality of aligning apparatuses configured to respectively form the aligned coils. Moreover, the diameters of the aligned coils of the given stator are different from the diameters of the aligned coils of another stator having different dimensions from the given stator. Therefore, to manufacture a plurality of stators having different dimensions, it is necessary to employ a plurality of dedicated machines each including a plurality of aligning apparatuses configured to respectively form a plurality of aligned coils having different diameters. Consequently, the manufacturing cost of the stators will be increased.

In contrast, with the configuration of the above-described aligning apparatus according to the present disclosure, it is possible to form aligned coils of various diameters by setting the radial position of the hole-forming members of the inner jig according to the positions where the second leg portions of the coil segments forming one aligned coil are to be respectively located during formation of the aligned coil. Consequently, it becomes possible to form all the aligned coils of a given armature (or stator) using a single machine that includes the aligning apparatus. Moreover, it also becomes possible to form, using the same machine, all the aligned coils of another armature having different dimensions from the given armature. As a result, it becomes unnecessary to employ a plurality of dedicated machines for manufacturing aligned coils for use in armatures having different dimensions. Hence, with the above configuration of the aligning apparatus, it becomes possible to reduce the cost of manufacturing aligned coils of various diameters.

The aligning apparatus according to the present disclosure operates as follows to form an aligned coil. First, the radial position of the hole-forming members of the inner jig is set according to the positions where the second leg portions of the coil segments are to be respectively located during formation of the aligned coil. Then, for each of the coil segments, the first and second leg portions of the coil segment are inserted respectively into the space between one circumferentially-adjacent pair of the partitioning members of the outer jig and the hole of one of the hole-forming members of the inner jig. Thereafter, the outer jig and the inner jig are rotated relative to each other, causing the first leg portions of the coil segments inserted between the partitioning members of the outer jig to be moved radially inward along the partitioning members. Further, after the first leg portions of the coil segments have been moved to the radially inner side of the partitioning members of the outer jig, the coil segments are pressed to cause the first leg portions of the coil segments to approach the hole-forming members of the inner jig, thereby aligning the coil segments in an annular shape to form the aligned coil.

Moreover, with the above-described method according to the present disclosure, it is possible to manufacture aligned coils of various diameters using the aligning apparatus at low cost.

Exemplary embodiments will be described hereinafter with reference to the drawings. It should be noted that for the sake of clarity and understanding, identical components having identical functions throughout the whole description have been marked, where possible, with the same reference numerals in each of the figures and that for the sake of avoiding redundancy, descriptions of identical components will not be repeated.

First Embodiment

An aligning apparatus 1 according to the first embodiment is configured to align a plurality of coil segments 4 (or electrical conductor segments) in an annular shape to form an aligned coil 2. The aligned coil 2 is then assembled into slots of an armature of a rotating electric machine. More particularly, in the present embodiment, the armature is configured as a stator of the rotating electric machine. In addition, the aligning apparatus 1 is installed in a part of a machine (not shown) for manufacturing aligned coils 2.

FIG. 1 shows both the aligning apparatus 1 according to the first embodiment and one aligned coil 2 which has been formed with the aligning apparatus 1 and removed from the aligning apparatus 1. The aligned coil 2 is then combined with other aligned coils 2 having different diameters from the aligned coil 2, and assembled into the slots of the armature.

In the present embodiment, each of the aligned coils 2 is formed of 48 coil segments 4. However, it should be noted that each of the aligned coils 2 may alternatively be formed of a different number of coil segments 4 than 48.

Figure 2:
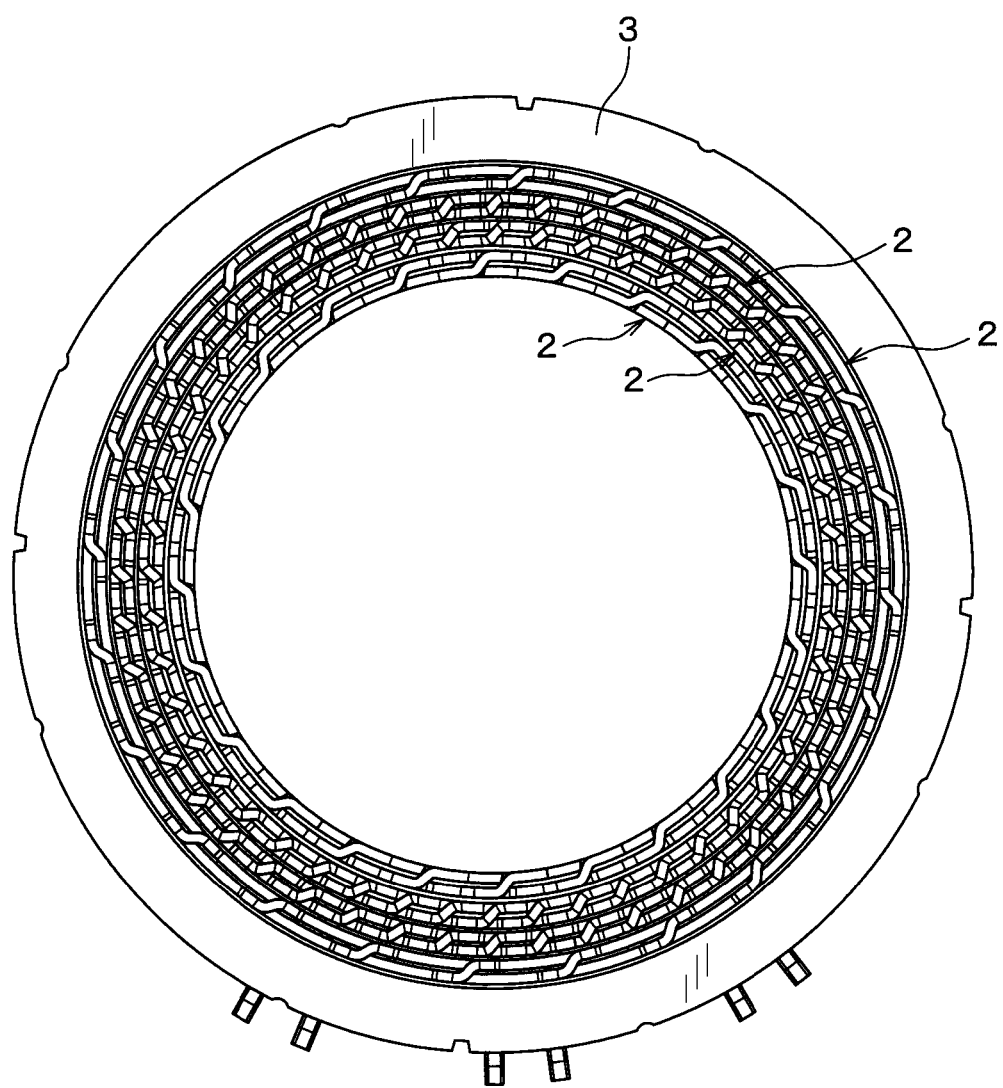
FIG. 2 is a plan view illustrating aligned coils, each of which is formed with the aligning apparatus according to the first embodiment, in a state of being inserted in slots of a stator core.

FIG. 2 illustrates four aligned coils 2, each of which is formed with the aligning apparatus 1 according to the first embodiment, in a state of being inserted in the slots of an annular stator core 3 of the stator (i.e., armature). The four aligned coils 2 have different diameters and are located at different radial positions in the slots of the stator core 3. More specifically, the diameters of the aligned coils 2 gradually increase from a radially inner side to a radially outer side in the slots of the stator core 3.

Figure 3:
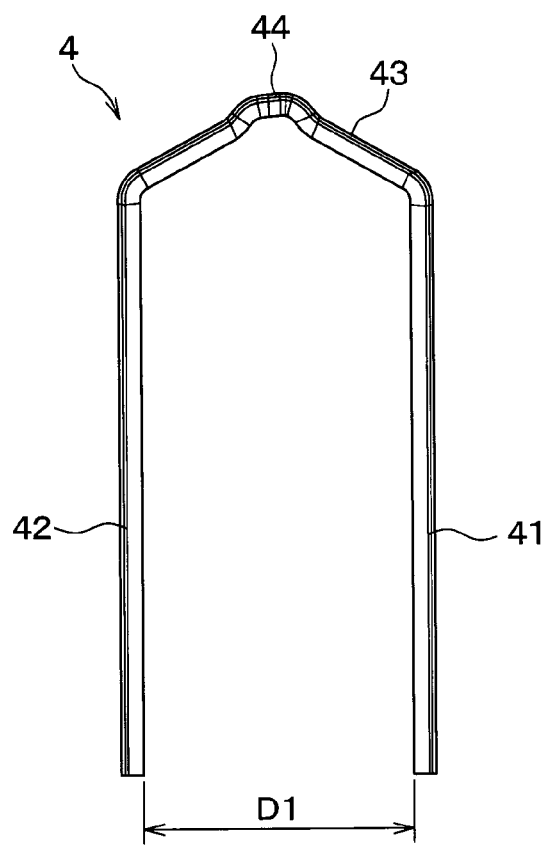
FIG. 3 is a side view of one of coil segments forming one of the aligned coils which is located radially innermost in the slots of the stator core.

FIG. 3 shows one of the coil segments 4 forming that one of the aligned coils 2 which is located radially innermost in the slots of the stator core 3. In contrast, FIG. 4 shows one of the coil segments 4 forming that one of the aligned coils 2 which is located radially outermost in the slots of the stator core 3.

Figure 4:
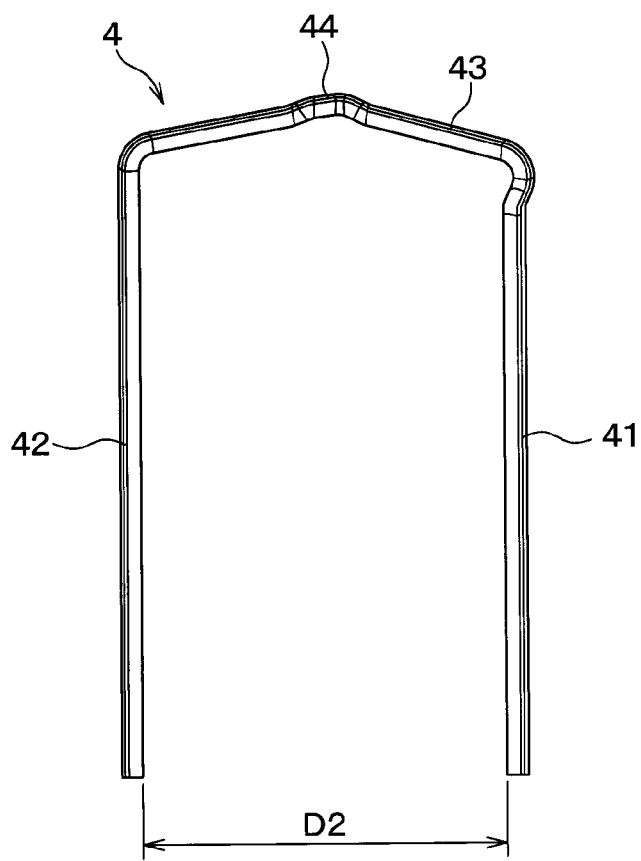
FIG. 4 is a side view of one of coil segments forming one of the aligned coils which is located radially outermost in the slots of the stator core.

As shown in FIGS. 3 and 4, each of the coil segments 4 is substantially U-shaped to have a pair of first and second leg portions 41 and 42 extending parallel to each other and a connecting portion 43 that connects the first and second leg portions 41 and 42.

The interval (or spacing distance) D1 between the first and second leg portions 41 and 42 of the coil segment 4 shown in FIG. 3 is smaller than the interval D2 between the first and second leg portions 41 and 42 of the coil segment 4 shown in FIG. 4. That is, the interval D1 between the first and second leg portions 41 and 42 in each of the coil segments 4 forming the aligned coil 2 located radially innermost in the slots of the stator core 3 is smaller than the interval D2 between the first and second leg portions 41 and 42 in each of the coil segments 4 forming the aligned coil 2 located radially outermost in the slots of the stator core 3.

Figure 5:
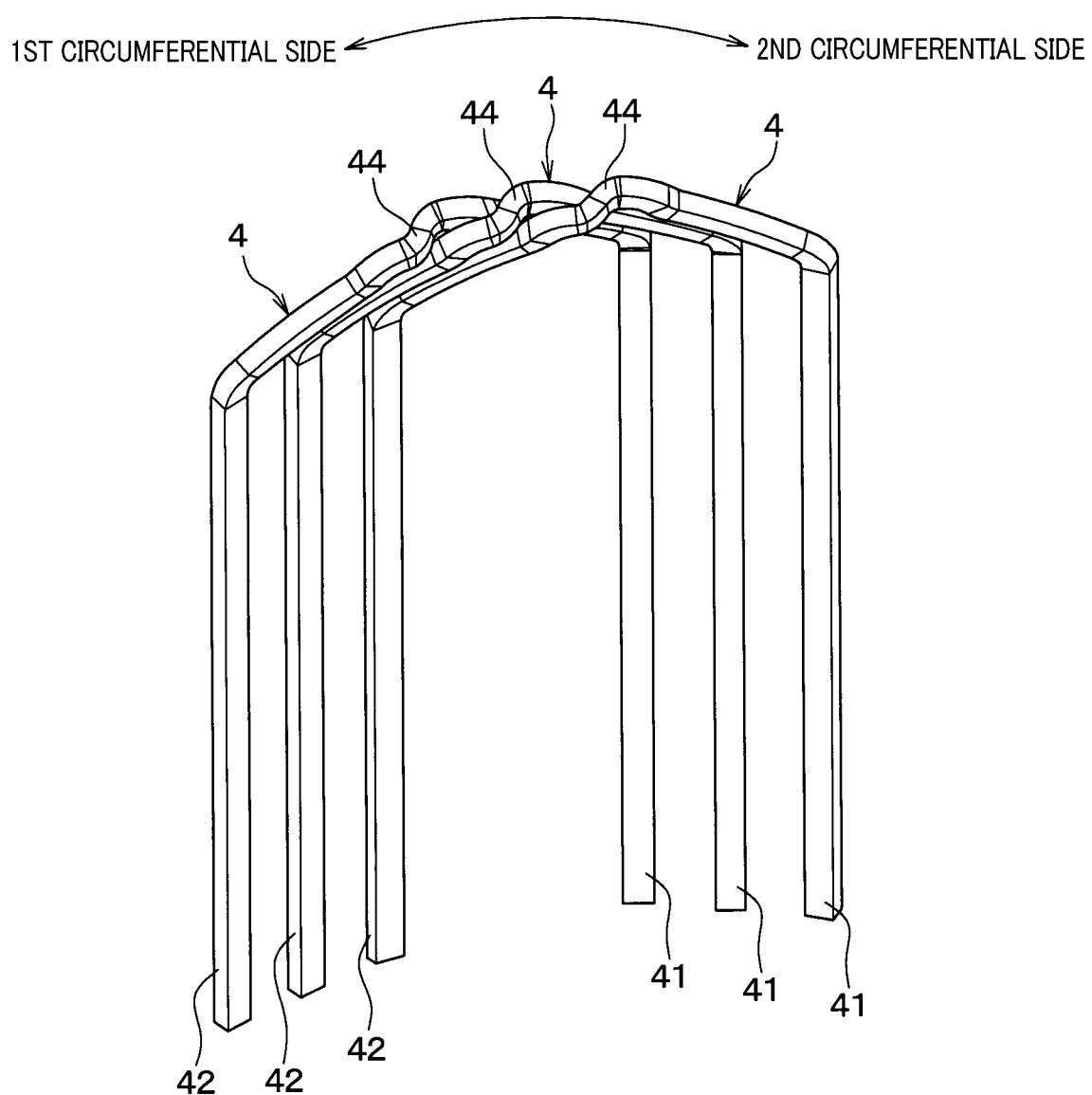
FIG. 5 is a perspective view of three adjacent coil segments among those coil segments which together constitute one of the aligned coils formed with the aligning apparatus according to the first embodiment.

FIG. 5 shows three adjacent coil segments 4 among those coil segments 4 which together form one of the aligned coils 2.

As shown in FIG. 5, in each of the coil segments 4, there is formed a crank-shaped part 44 at the center of the connecting portion 43 (see also FIGS. 3 and 4). Specifically, the crank-shaped part 44 is bent in both a radial direction and an axial direction of the stator core 3. Consequently, for each adjacent pair of the coil segments 4, under a first-circumferential-side part of one of the adjacent pair of the coil segments 4 which is located on a first circumferential side of the other coil segment 4, there is located a first-circumferential-side part of the other coil segment 4; above a second-circumferential-side part of the one of the adjacent pair of the coil segments 4 which is located on the first circumferential side of the other coil segment 4, there is located a second-circumferential-side part of the other coil segment 4. In addition, in each of the coil segments 4, the first-circumferential-side part is located on the first circumferential side of the crank-shaped part 44; the second-circumferential-side part is located on the second circumferential side of the crank-shaped part 44.

It should be noted that for the sake of convenience of explanation, hereinafter, the pair of first and second leg portions 41 and 42 in each of the coil segments 4 will be described such that the first leg portion 41 is located radially outside the second leg portion 42. Moreover, it also should be noted that for the sake of simplicity, hereinafter, the circumferential, radial and axial directions of the aligning apparatus 1 will be merely referred to as the circumferential, radial and axial directions. In addition, the circumferential, radial and axial directions of the aligning apparatus 1 respectively coincide with the circumferential, radial and axial directions of each aligned coil 2 formed with the aligning apparatus 1. Next, the configuration of the aligning apparatus 1 according to the present embodiment will be described with reference to FIGS. 1 and 6-11.

Figure 6:
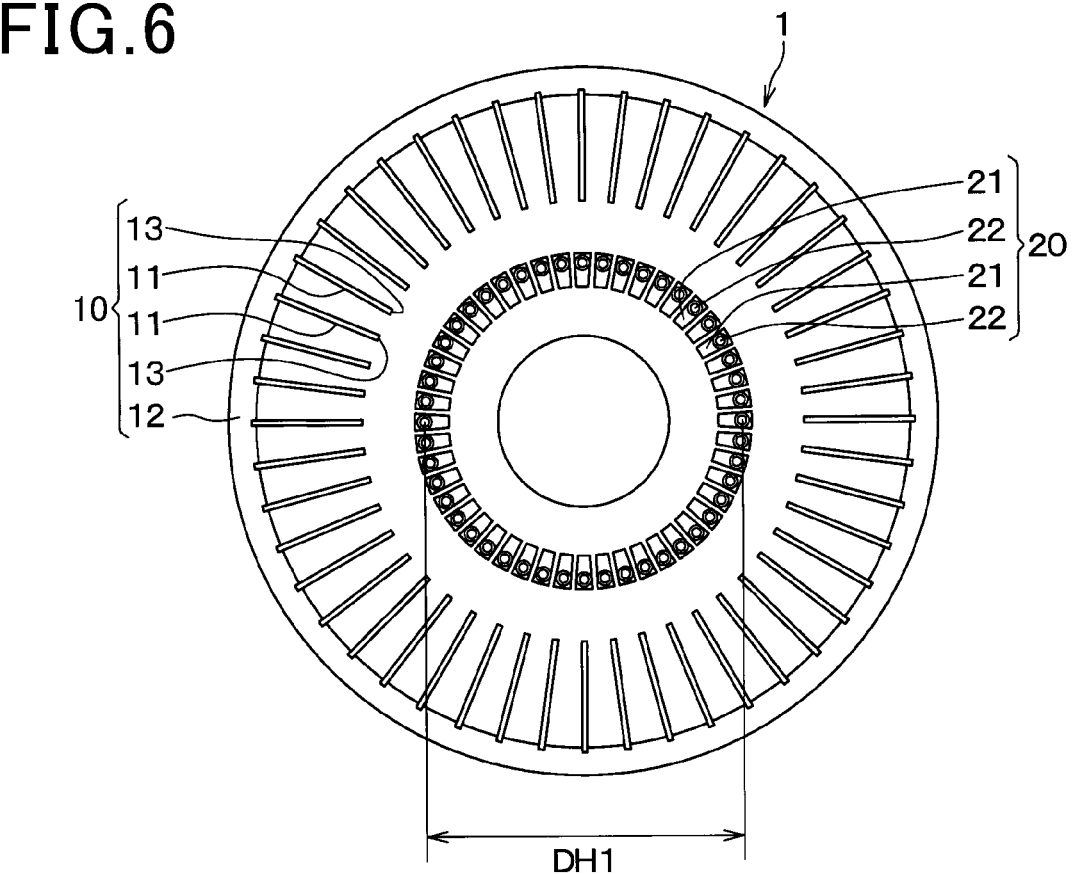
FIG. 6 is a plan view illustrating both an outer jig and an inner jig of the aligning apparatus according to the first embodiment, wherein hole-forming members of the inner jig are located at a first radial position.
Figure 7:
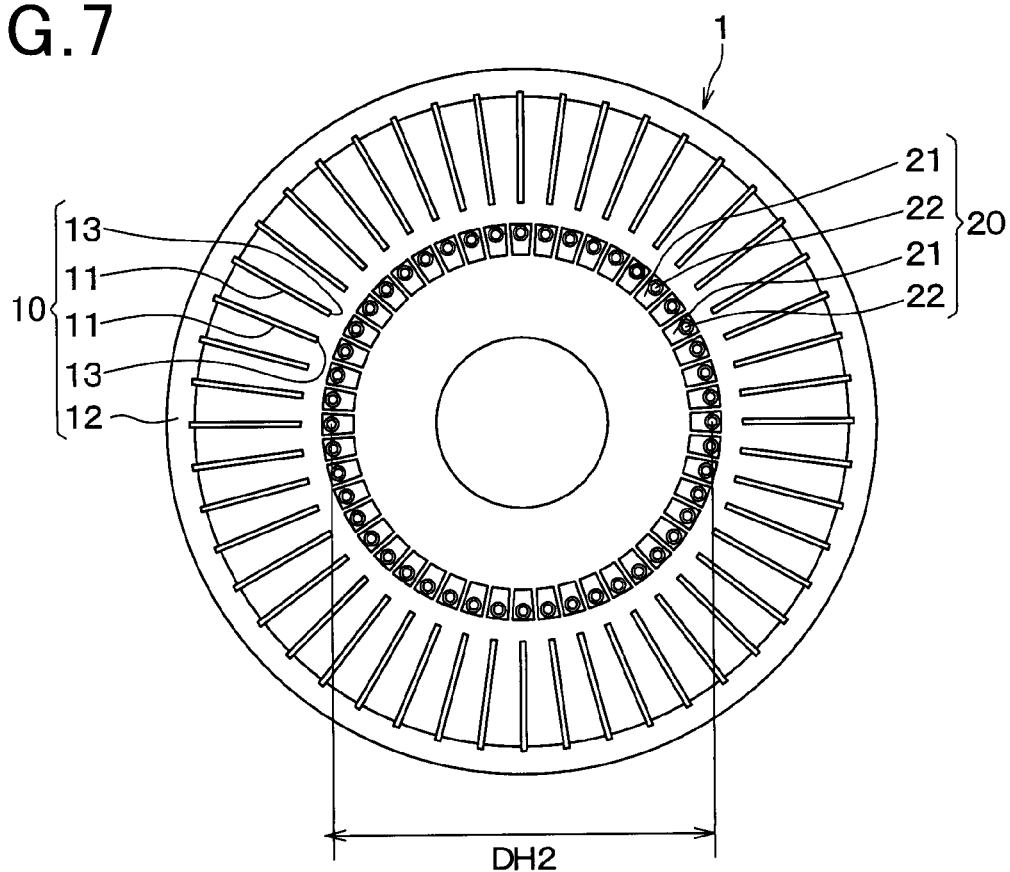
FIG. 7 is another plan view illustrating both the outer jig and the inner jig of the aligning apparatus according to the first embodiment, wherein the hole-forming members of the inner jig are located at a second radial position.

As shown in FIGS. 1, 6 and 7, the aligning apparatus 1 includes an outer jig 10 and an inner jig 20.

The outer jig 10 has a plurality of partitioning members 11 and an annular connecting portion 12 that connects all the partitioning members 11. Each of the partitioning members 11 is plate-shaped. The partitioning members 11 are arranged in a radial fashion and spaced at such intervals as to allow each of the first leg portions 41 of the coil segments 4 to be inserted between one circumferentially-adjacent pair of the partitioning members 11. Moreover, each of the partitioning members 11 has its radially-inner end surface 13 located radially outside the radially outer periphery of an aligned coil 2 formed with the aligning apparatus 1. Moreover, between the radially-inner end surfaces 13 of each circumferentially-adjacent pair of the partitioning members 11, there is formed an opening through which one of the first leg portions 41 of the coil segments 4 can pass.

In the present embodiment, the outer jig 10 has 48 partitioning members 11. However, it should be noted that the outer jig 10 may alternatively have a different number of partitioning members 11 than 48. Moreover, the outer jig 10 is rotatable in the circumferential direction upon being driven by a rotating mechanism (not shown).

The inner jig 20 has a plurality of hole-forming members 21 aligned in an annular shape. The hole-forming members 21 are located radially inside the radially-inner end surfaces 13 of the partitioning members 11 of the outer jig 10. Each of the hole-forming members 21 has formed therein a hole 22 in which one of the second leg portions 42 of the coil segments 4 is to be inserted. Moreover, for each of the holes 22 of the hole-forming members 21, the inner diameter of the hole 22 is set so as to allow that one of the second leg portions 42 of the coil segments 4 which is inserted in the hole 22 to rotate about the axis of the second leg portion 42 in the hole 22.

The hole-forming members 21 of the inner jig 20 are rotatable in the circumferential direction upon being driven by the not-shown rotating mechanism. The axis of rotation of the hole-forming members 21 of the inner jig 20 coincides with the axis of rotation of the partitioning members 11 of the outer jig 10.

The outer jig 10 and the inner jig 20 are capable of rotating in the same direction by the same rotation angle. Hereinafter, the operation of the outer jig 10 and the inner jig 20 in which they rotate in the same direction by the same rotation angle will be referred to as first operation.

Moreover, the outer jig 10 and the inner jig 20 are also capable of rotating relative to each other. Hereinafter, the operation of the outer jig 10 and the inner jig 20 in which they rotate relative to each other will be referred to as second operation.

Furthermore, in the present embodiment, the hole-forming members 21 of the inner jig 20 are configured to be radially movable under the guidance of respective guide rails (not shown).

FIG. 6 shows the hole-forming members 21 of the inner jig 20 aligned in an annular shape and located at a first radial position. In contrast, FIG. 7 shows the hole-forming members 21 of the inner jig 20 aligned in an annular shape and located at a second radial position that is radially outward of the first radial position.

As above, the hole-forming members 21 of the inner jig 20 are aligned in an annular shape and radially movable. Therefore, it is possible to change the radial position of the hole-forming members 21 of the inner jig 20 according to the diameters of aligned coils 2.

In FIG. 6, there is shown the distance DH1 between the centers of the holes 22 of one pair of the hole-forming members 21 which both fall on an imaginary straight line (not depicted in FIG. 6) extending through the radial center of the entire inner jig 20 and are respectively located on opposite sides of the radial center of the entire inner jig 20. Moreover, in FIG. 7, there is shown the distance DH2 between the centers of the holes 22 of one pair of the hole-forming members 21 which both fall on an imaginary straight line (not depicted in FIG. 7) extending through the radial center of the entire inner jig 20 and are respectively located on opposite sides of the radial center of the entire inner jig 20.

The distance DH1 shown in FIG. 6 is smaller than the distance DH2 shown in FIG. 7. These distances DH1 and DH2 correspond to the distance between one pair of the second leg portions 42 of the coil segments 4 which are both arranged on an imaginary straight line extending through the radial center of the entire inner jig 20 and respectively located on opposite sides of the radial center of the entire inner jig 20.

As above, in the aligning apparatus 1 according to the present embodiment, it is possible to set the radial position of the holes 22 of the hole-forming members 21 according to the radial position of the second leg portions 42 of the coil segments 4. Consequently, it becomes possible to form aligned coils 2 of various diameters using the aligning apparatus 1.

Figure 8:
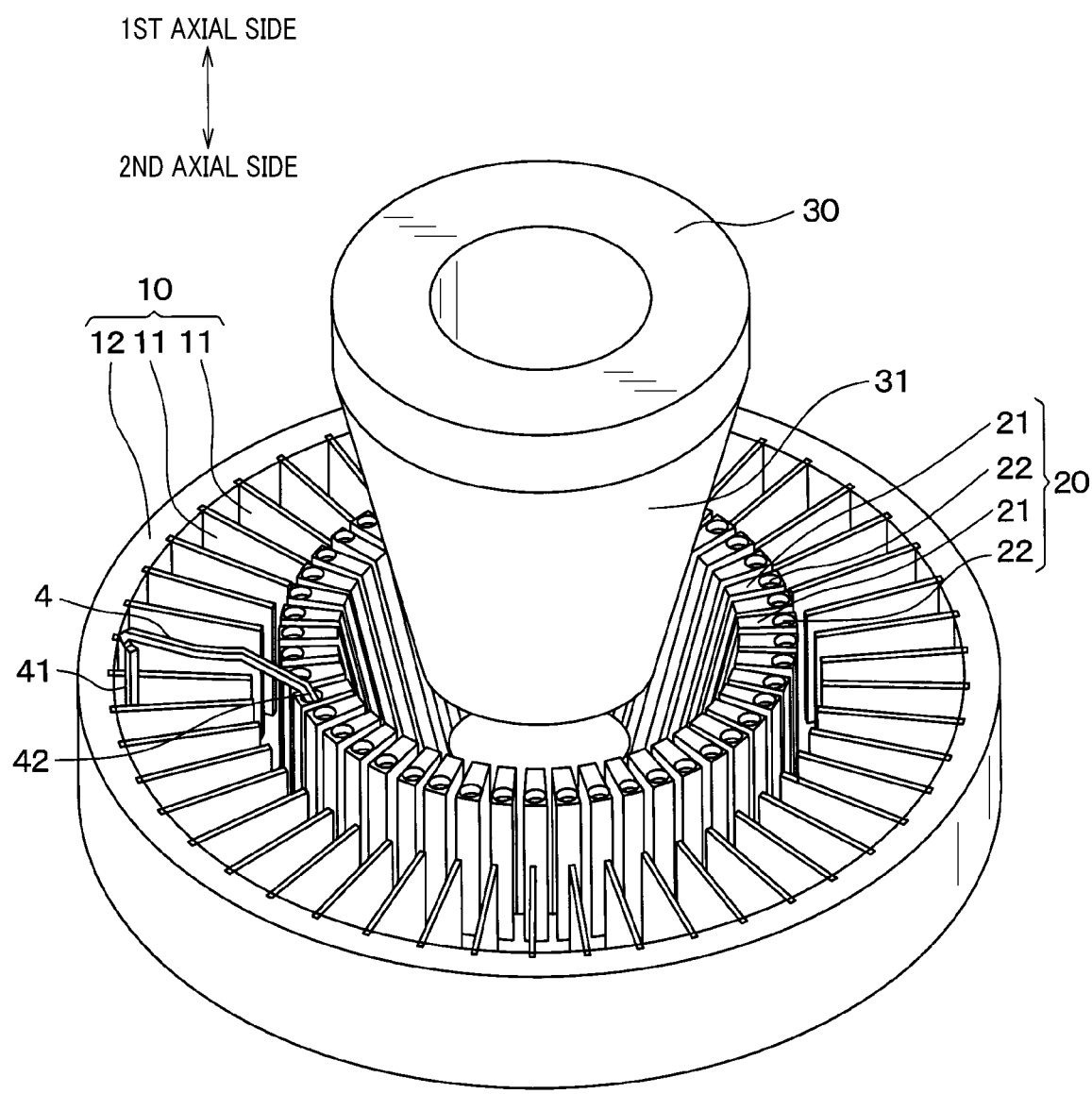
FIG. 8 is a perspective view illustrating the outer jig, the inner jig and a taper member of the aligning apparatus according to the first embodiment.
Figure 9:
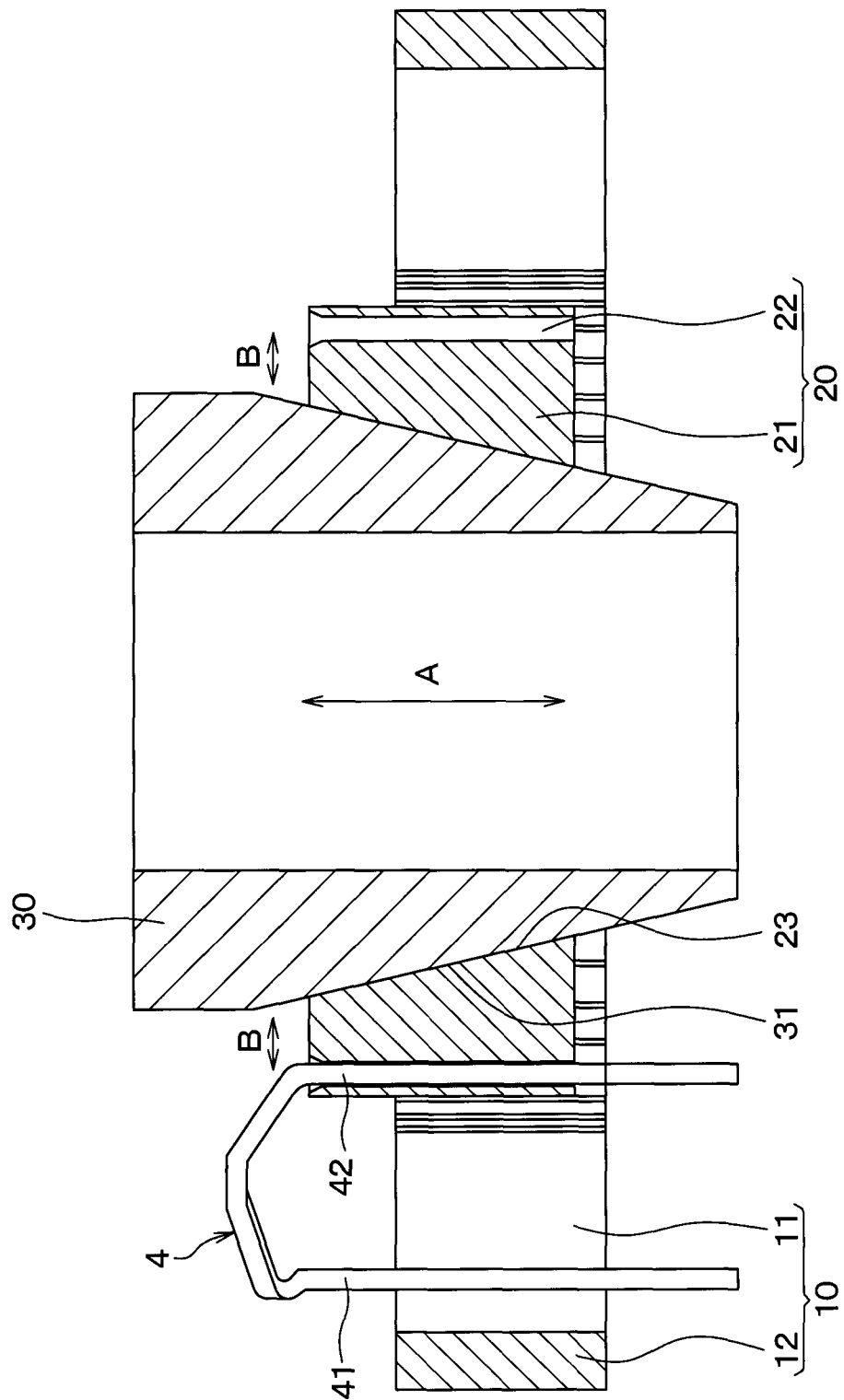
FIG. 9 is an explanatory diagram illustrating the operation of the taper member for changing the radial position of the hole-forming members of the inner jig in the aligning apparatus according to the first embodiment.
Figure 10:
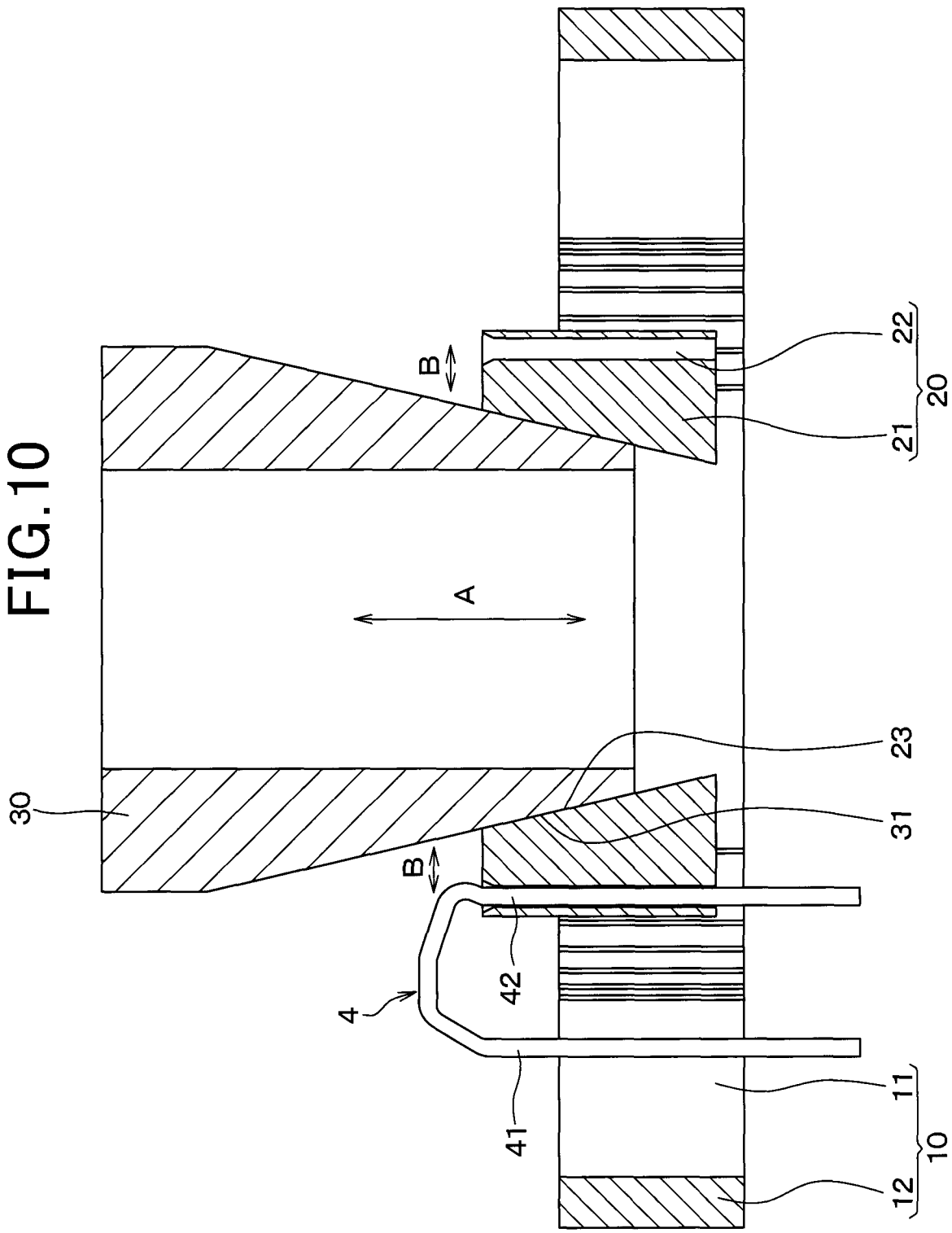
FIG. 10 is another explanatory diagram illustrating the operation of the taper member for changing the radial position of the hole-forming members of the inner jig in the aligning apparatus according to the first embodiment.

In the present embodiment, the hole-forming members 21 of the inner jig 20 are configured to be radially moved by a taper member 30 as shown in FIGS. 8-10.

The taper member 30 has a taper surface 31 formed to have its outer diameter gradually decreasing from a first side to a second side (i.e., from the upper side to the lower side in FIG. 8 and from the left side to the right side in FIGS. 9 and 10) in the axial direction (or the direction of the axis of rotation) of the inner jig 20. The taper member 30 is configured to be movable in the axial direction of the inner jig 20 upon being driven by a drive mechanism (not shown). Moreover, the taper member 30 is formed so that it can be inserted into the space radially inside the hole-forming members 21 of the inner jig 20.

On the other hand, each of the hole-forming members 21 of the inner jig 20 has its radially inner surface formed as an inclined surface 23 that is inclined from the radially outer side to the radially inner side while extending from the first side to the second side in the axial direction of the inner jig 20.

Consequently, as shown in FIGS. 9 and 10, with movement of the taper member 30 in the axial direction, the taper surface 31 of the taper member 30 makes sliding contact with the inclined surfaces 23 of the hole-forming members 21 of the inner jig 20, causing the hole-forming members 21 to be radially moved. As a result, the hole-forming members 21 of the inner jig 20 are radially moved keeping the state of being aligned in the annular shape.

In addition, in FIGS. 9 and 10, the direction of movement of the taper member 30 is indicated with an arrow A and the direction of movement of the hole-forming members 21 of the inner jig 20 is indicated with arrows B.

Figure 11:
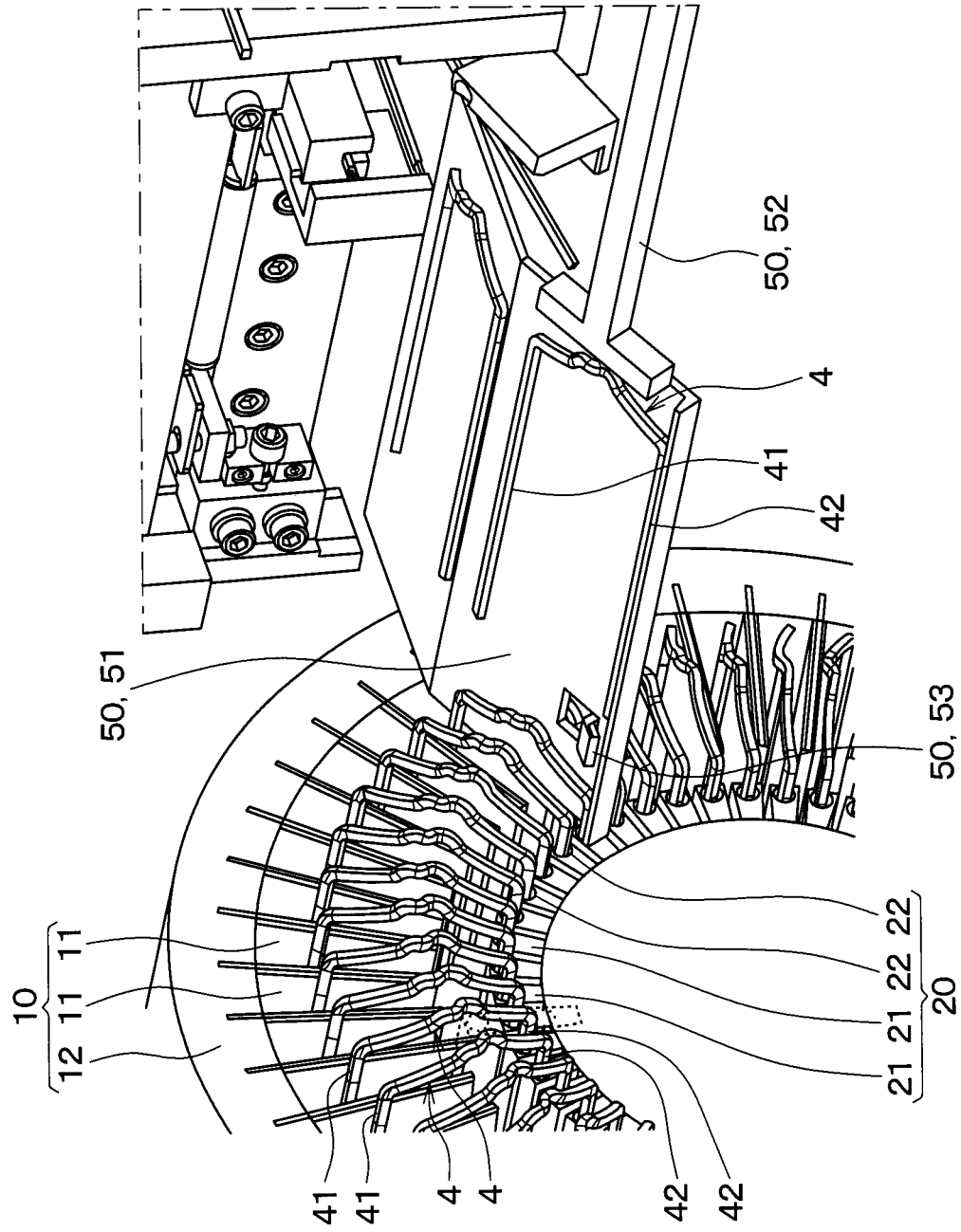
FIG. 11 is a perspective view illustrating the outer jig, the inner jig and an insertion mechanism of the aligning apparatus according to the first embodiment.

In the present embodiment, the aligning apparatus 1 further includes an insertion mechanism 50 as shown in FIG. 11. The insertion mechanism 50 includes a placing plate 51, a pusher 52 and a coil-segment guide 53.

The placing plate 51 is a plate member on which the coil segments 4 are placed one by one before being inserted into the outer jig 10 and the inner jig 20. More specifically, on the placing plate 51, each of the coil segments 4 is placed to have the first leg portion 41 of the coil segment 4 arranged on an imaginary straight line extending between one circumferentially-adjacent pair of the partitioning members 11 of the outer jig 10 and the second leg portion 42 of the coil segment 4 arranged on an imaginary straight line extending through the center of the hole 22 of one of the hole-forming members 21 of the inner jig 20.

The pusher 52 is a pushing member which is configured to push the coil segment 4 placed on the placing plate 51 toward the outer jig 10 and the inner jig 20. More specifically, the pusher 52 pushes the coil segment 4 placed on the placing plate 51 to have the first leg portion 41 of the coil segment 4 inserted between one circumferentially-adjacent pair of the partitioning members 11 of the outer jig 10 and the second leg portion 42 of the coil segment 4 inserted into the hole 22 of one of the hole-forming members 21 of the inner jig 20.

The coil-segment guide 53 is a guide member which is configured to guide the second leg portion 42 of the coil segment 4 placed on the placing plate 51 to the hole 22 of one of the hole-forming members 21 of the inner jig 20. More specifically, the coil-segment guide 53 slidably supports the second leg portion 42 of the coil segment 4 placed on the placing plate 51 while the pusher 52 pushes the coil segment 4. After at least part of the second leg portion 42 of the coil segment 4 has been inserted into the hole 22 of one of the hole-forming members 21 of the inner jig 20, the coil-segment guide 53 releases the second leg portion 42 of the coil segment 4.

Consequently, with the placing plate 51, the pusher 52 and the coil-segment guide 53 of the insertion mechanism 50, it becomes possible to accurately insert, for each of the coil segments 4, the first leg portion 41 of the coil segment 4 into the space between one circumferentially-adjacent pair of the partitioning members 11 of the outer jig 10 and the second leg portion 42 of the coil segment 4 into the hole 22 of one of the hole-forming members 21 of the inner jig 20.

Figure 19:
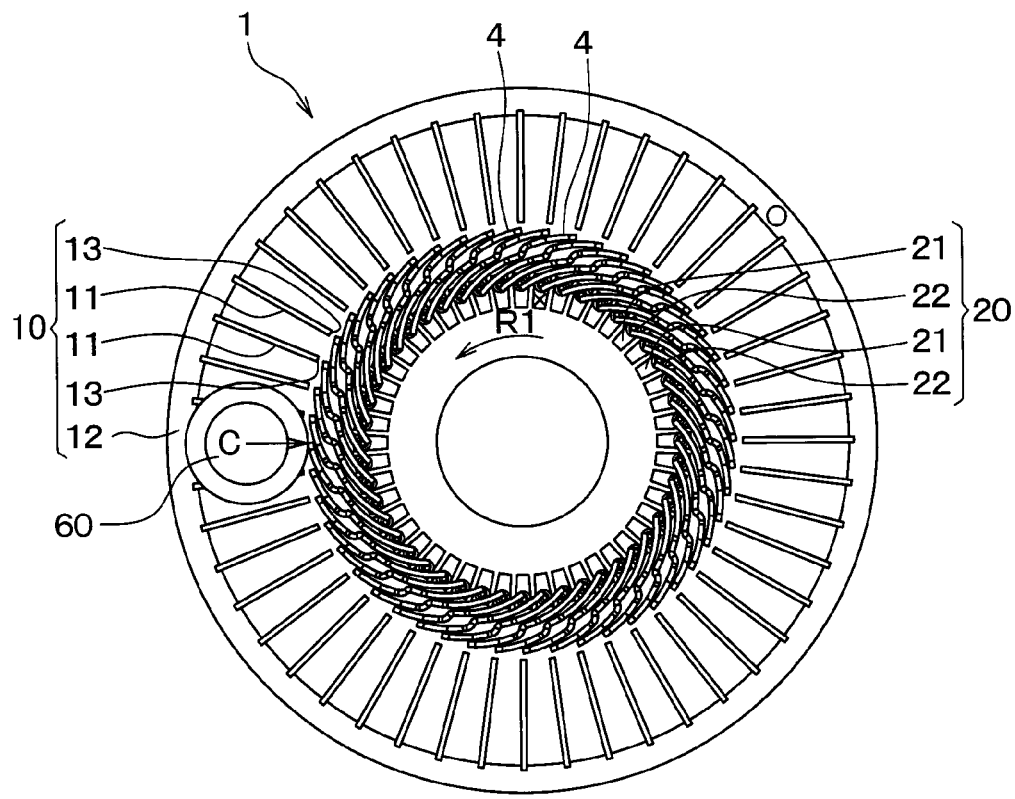
FIG. 19 is an eighth explanatory diagram illustrating the operation of the aligning apparatus according to the first embodiment.
Figure 20:
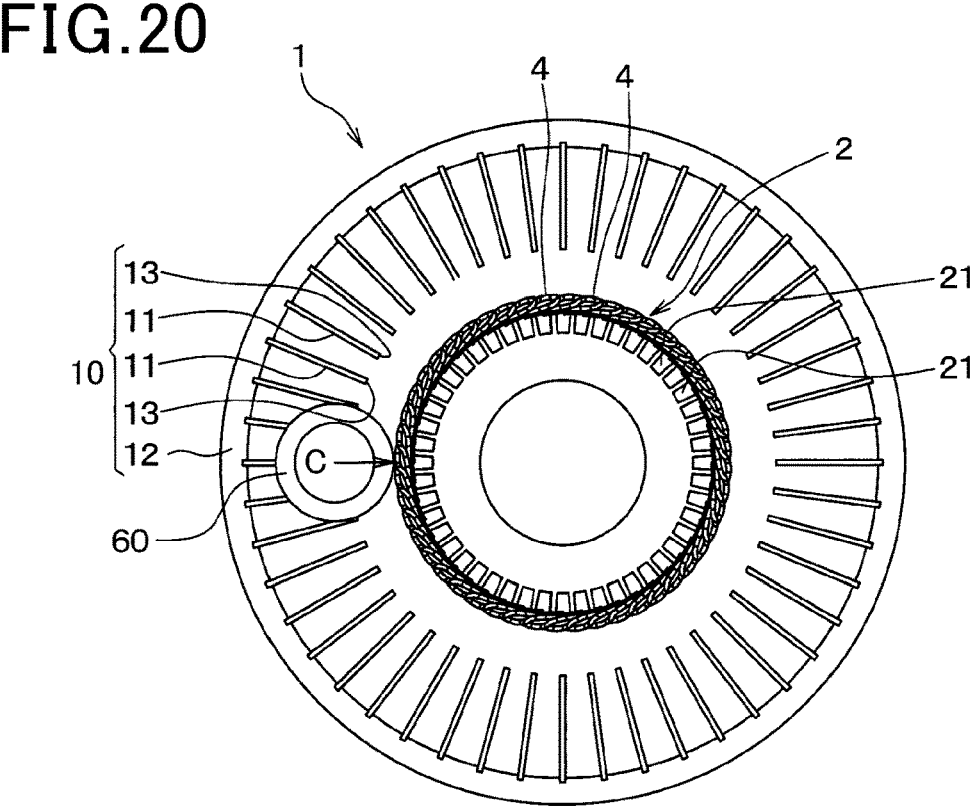
FIG. 20 is a ninth explanatory diagram illustrating the operation of the aligning apparatus according to the first embodiment.

In the present embodiment, the aligning apparatus 1 further includes a roller 60 as shown in FIGS. 19 and 20. The roller 60 is a pressing member which is configured to press the coil segments 4, from a position radially inside the radially-inner end surfaces 13 of the partitioning members 11 of the outer jig 10, toward the hole-forming members 21 of the inner jig 20.

Next, the operation of the aligning apparatus 1 according to the present embodiment will be described with reference to FIGS. 12-20.

It should be noted that in FIGS. 12-17 and the following explanation, the three coil segments 4 which are inserted first, second and third among all the 48 coil segments 4 forming one adjoined coil 2 are respectively denoted by 4a, 4b and 4c. Moreover, it also should be noted that: in FIGS. 13-16, 18 and 19, the rotational direction of the inner jig 20 is indicated with an arrow R1; and in FIGS. 13-16, the rotational direction of the outer jig 10 is indicated with an arrow R2. Furthermore, it also should be noted that in FIGS. 12-17, for illustrating the rotation of the outer jig 10 and the rotation of the inner jig 20, a given position in the connecting portion 12 of the outer jig 10 is marked with a "○" sign; and a given one of the hole-forming members 21 of the inner jig 20 is marked with a □×□sign.

Figure 12:
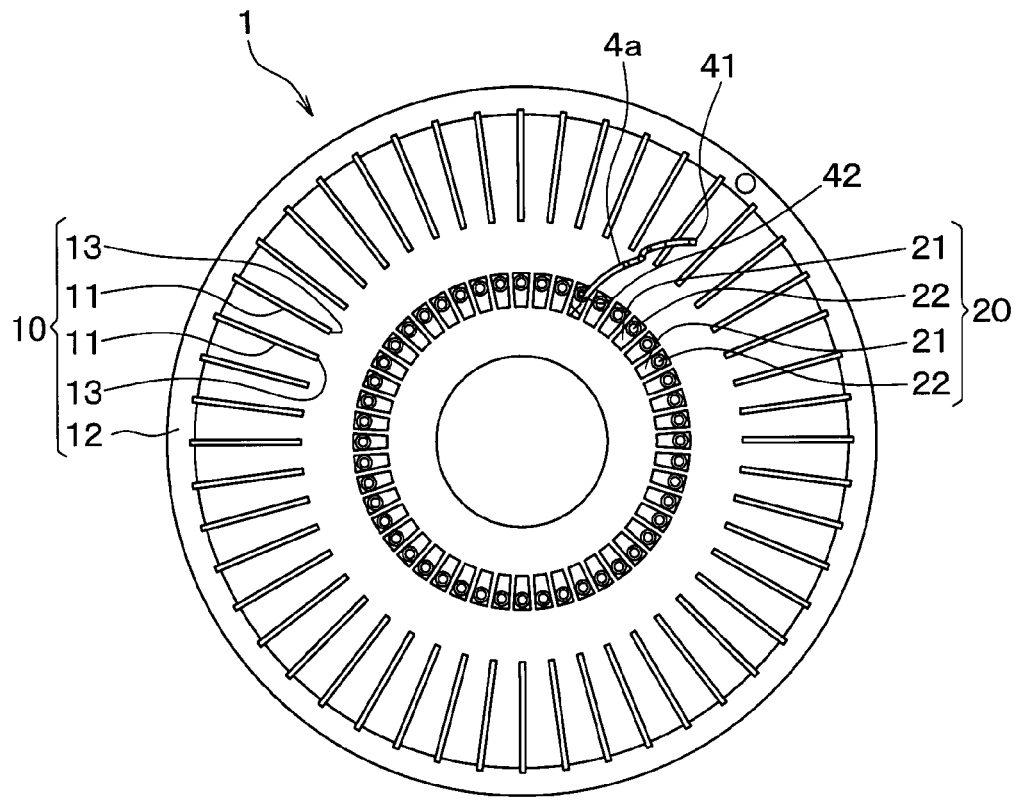
FIG. 12 is a first explanatory diagram illustrating the operation of the aligning apparatus according to the first embodiment.

First, as shown in FIG. 12, the first leg portion 41 of the first coil segment 4a is inserted into the space between a first circumferentially-adjacent pair of the partitioning members 11 of the outer jig 10 while the second leg portion 42 of the first coil segment 4a is inserted into the hole 22 of a first one of the hole-forming members 21 of the inner jig 20.

In addition, as described above, the insertion of the first and second leg portions 41 and 42 of each of the coil segments 4 is performed by the insertion mechanism 50.

Figure 13:
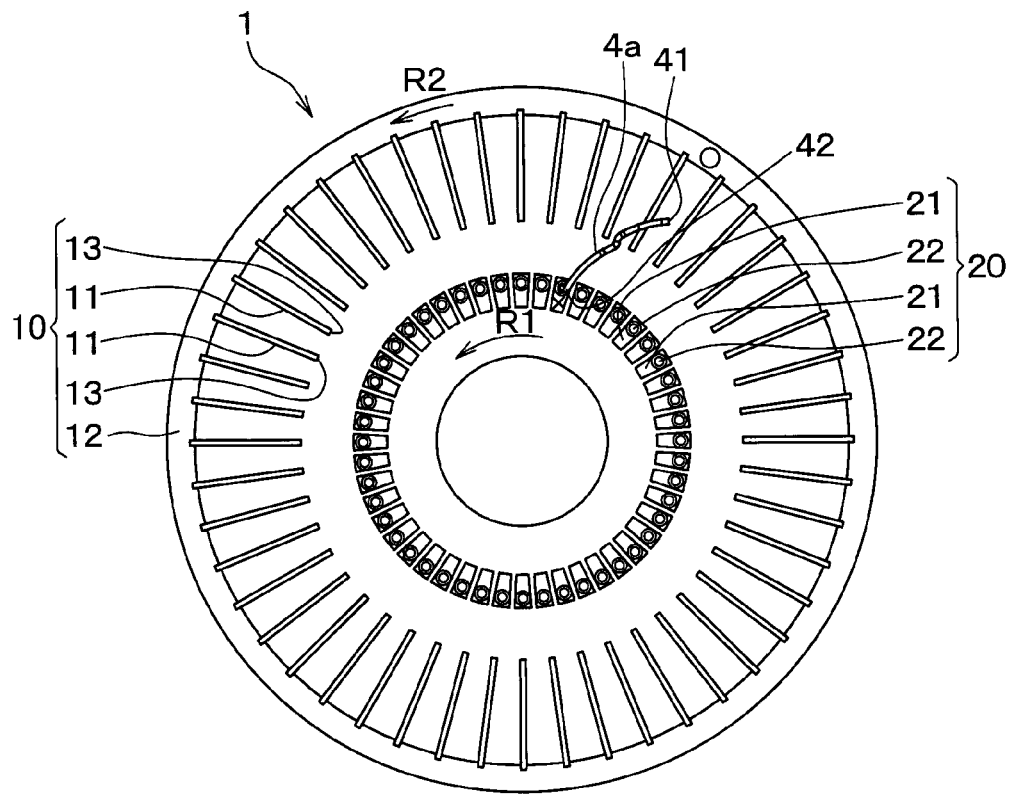
FIG. 13 is a second explanatory diagram illustrating the operation of the aligning apparatus according to the first embodiment.

Then, as shown in FIG. 13, both the outer jig 10 and the inner jig 20 are rotated in the same direction by an angle corresponding to the interval between each circumferentially-adjacent pair of the partitioning members 11 of the outer jig 10. That is, the outer jig 10 and the inner jig 20 perform the above-described first operation. In addition, the angle corresponding to the interval between each circumferentially-adjacent pair of the partitioning members 11 will be referred to as □one pitch□hereinafter.

Figure 14:
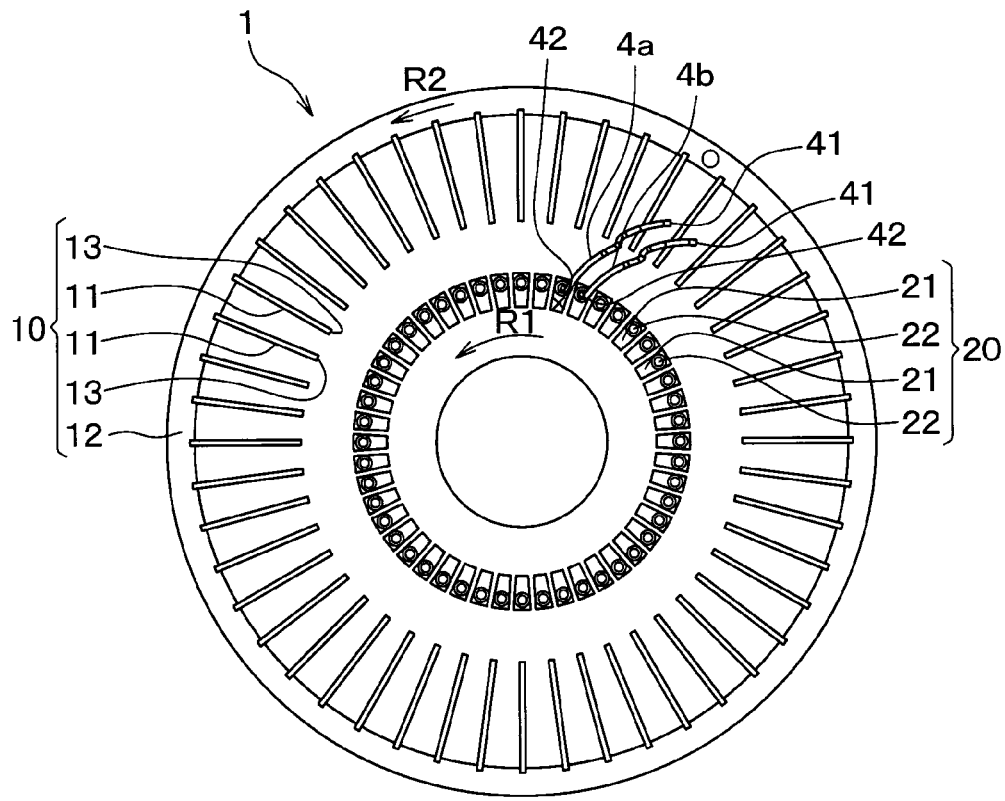
FIG. 14 is a third explanatory diagram illustrating the operation of the aligning apparatus according to the first embodiment.

Next, as shown in FIG. 14, the first leg portion 41 of the second coil segment 4b is inserted into the space between a second circumferentially-adjacent pair of the partitioning members 11 of the outer jig 10 while the second leg portion 42 of the second coil segment 4b is inserted into the hole 22 of a second one of the hole-forming members 21 of the inner jig 20.

Figure 15:
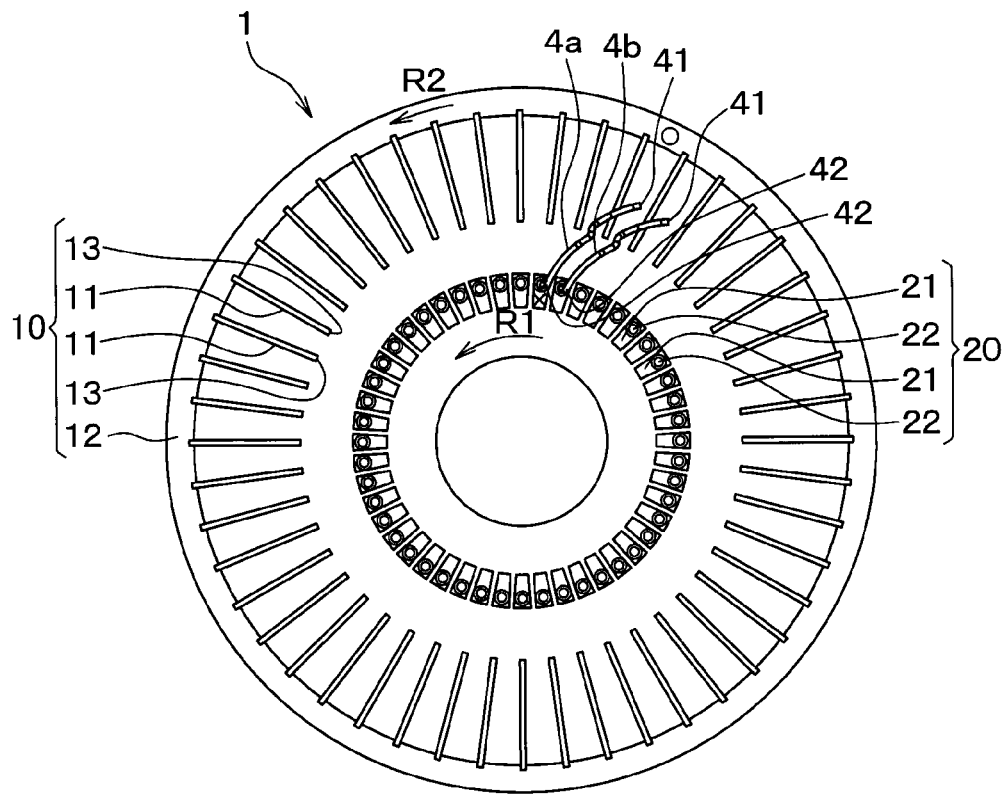
FIG. 15 is a fourth explanatory diagram illustrating the operation of the aligning apparatus according to the first embodiment.

Then, as shown in FIG. 15, both the outer jig 10 and the inner jig 20 are rotated in the same direction by one pitch.

Figure 16:
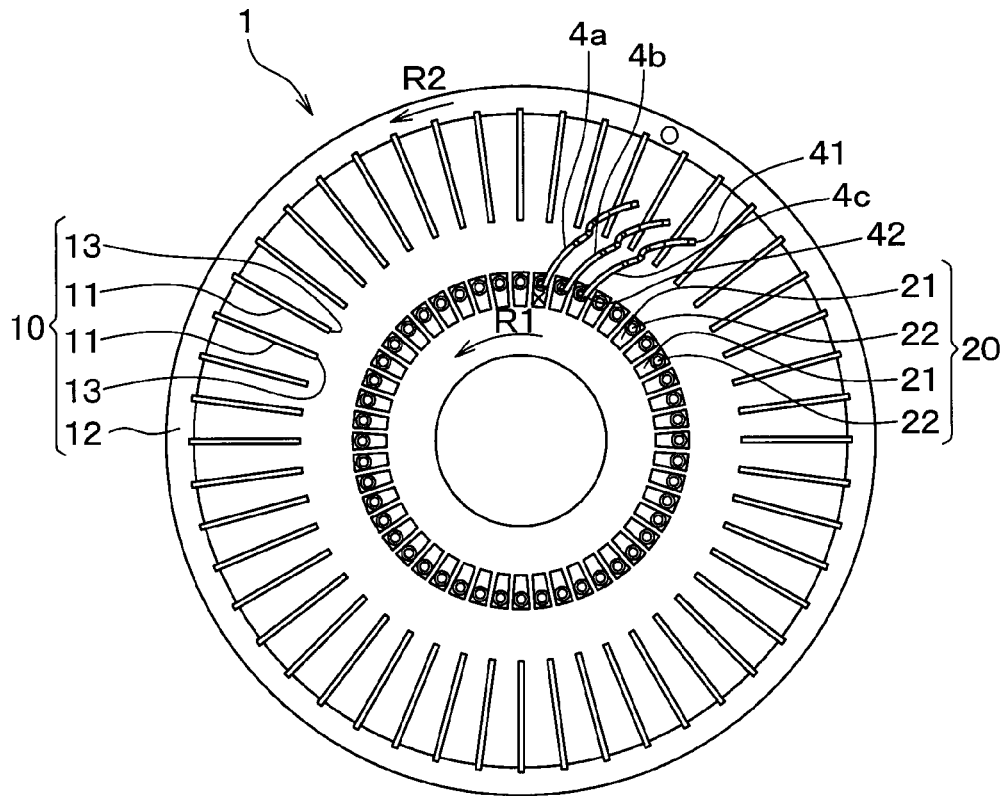
FIG. 16 is a fifth explanatory diagram illustrating the operation of the aligning apparatus according to the first embodiment.

Further, as shown in FIG. 16, the first leg portion 41 of the third coil segment 4c is inserted into the space between a third circumferentially-adjacent pair of the partitioning members 11 of the outer jig 10 while the second leg portion 42 of the third coil segment 4c is inserted into the hole 22 of a third one of the hole-forming members 21 of the inner jig 20. Then, both the outer jig 10 and the inner jig 20 are rotated in the same direction by one pitch.

Furthermore, in the same manner as the first to the third coil segments 4a-4c, the first and second leg portions 41 and 42 of each of the subsequent coil segments 4 (i.e., the fourth to the 48th coil segments 4) are inserted respectively into the space between a corresponding circumferentially-adjacent pair of the partitioning members 11 of the outer jig 10 and the hole 22 of a corresponding one of the hole-forming members 21 of the inner jig 20; during the time interval between the insertions of each consecutive pair of the coil segments 4, both the outer jig 10 and the inner jig 20 are rotated in the same direction by one pitch.

Figure 17:
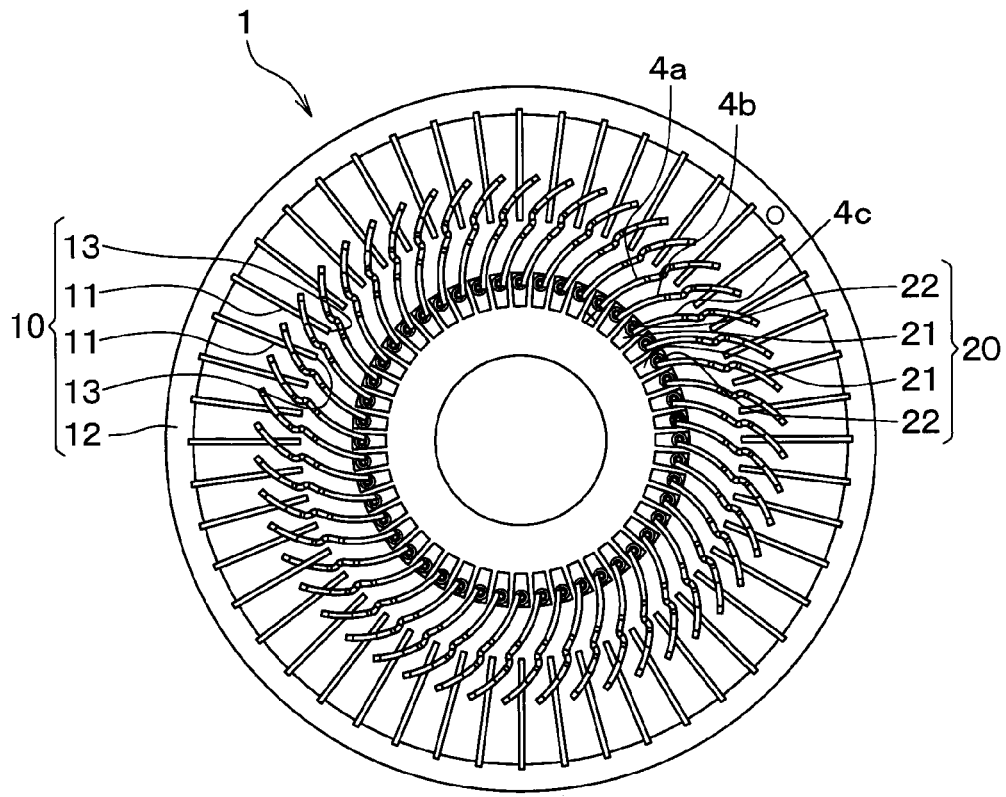
FIG. 17 is a sixth explanatory diagram illustrating the operation of the aligning apparatus according to the first embodiment.

FIG. 17 illustrates all the 48 coil segments 4 forming one adjoined coil 2 in a state of having been inserted into the outer jig 10 and the inner jig 20.

Figure 18:
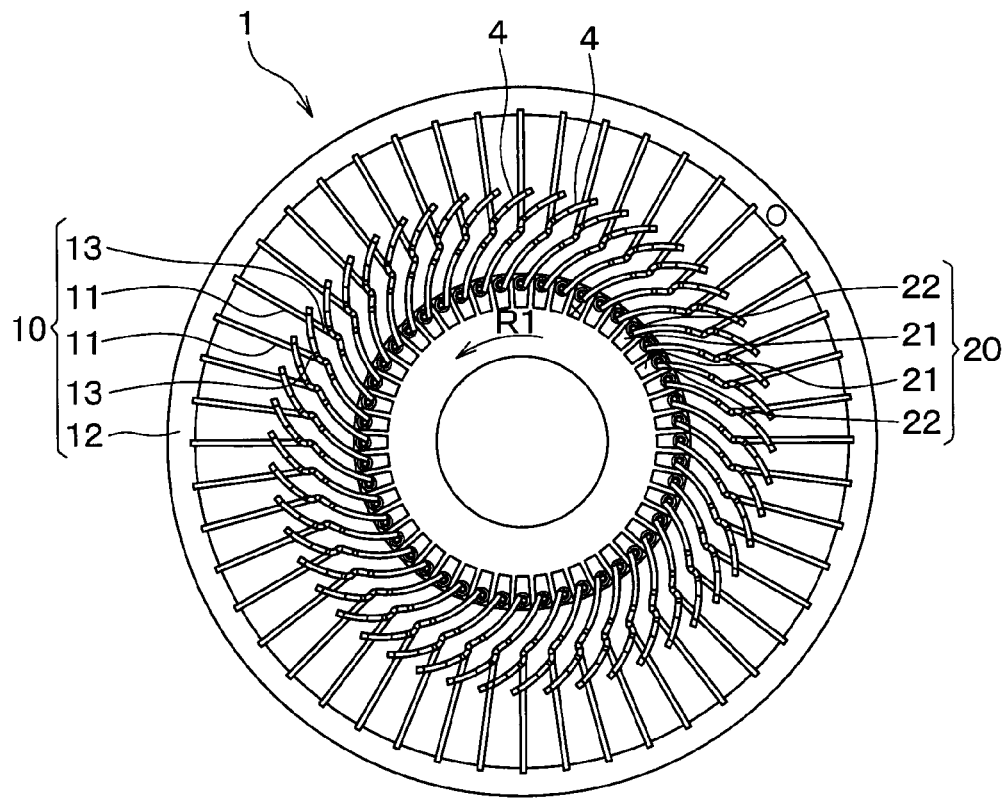
FIG. 18 is a seventh explanatory diagram illustrating the operation of the aligning apparatus according to the first embodiment.

Next, as shown in FIG. 18, with the outer jig 10 kept stationary, only the inner jig 20 is rotated in the rotational direction R1. Consequently, the outer jig 10 and the inner jig 20 rotate relative to each other. That is, the outer jig 10 and the inner jig 20 perform the above-described second operation.

With the second operation performed by the outer jig 10 and the inner jig 20, the first leg portions 41 of all the coil segments 4 inserted between the partitioning members 11 of the outer jig 10 are moved radially inward along the partitioning members 11. At the same time, each of the second leg portions 42 of all the coil segments 4, which are inserted respectively in the holes 22 of the hole-forming members 21 of the inner jig 20, rotates about its axis in the respective hole 42.

As shown in FIG. 19, upon the rotation of the inner jig 20 by a predetermined angle, the first leg portions 41 of all the coil segments 4 are moved to the radially inner side of the radially-inner end surfaces 13 of the partitioning members 11 of the outer jig 10. Then, the coil segments 4 are pressed by the roller 60 radially inward (i.e., toward the hole-forming members 21 of the inner jig 20).

More specifically, in FIG. 19, the direction in which the roller 60 presses the coil segments 4 is indicated with an arrow C. The roller 60 presses the coil segments 4 radially inward while the inner jig 20 rotates in the rotational direction R1. Consequently, the first leg portions 41 of all the coil segments 4 are caused to approach the hole-forming members 21 of the inner jig 20.

As a result, as shown in FIG. 20, all the coil segments 4 are circumferentially aligned in an annular shape to form one aligned coil 2.

Figure 21:
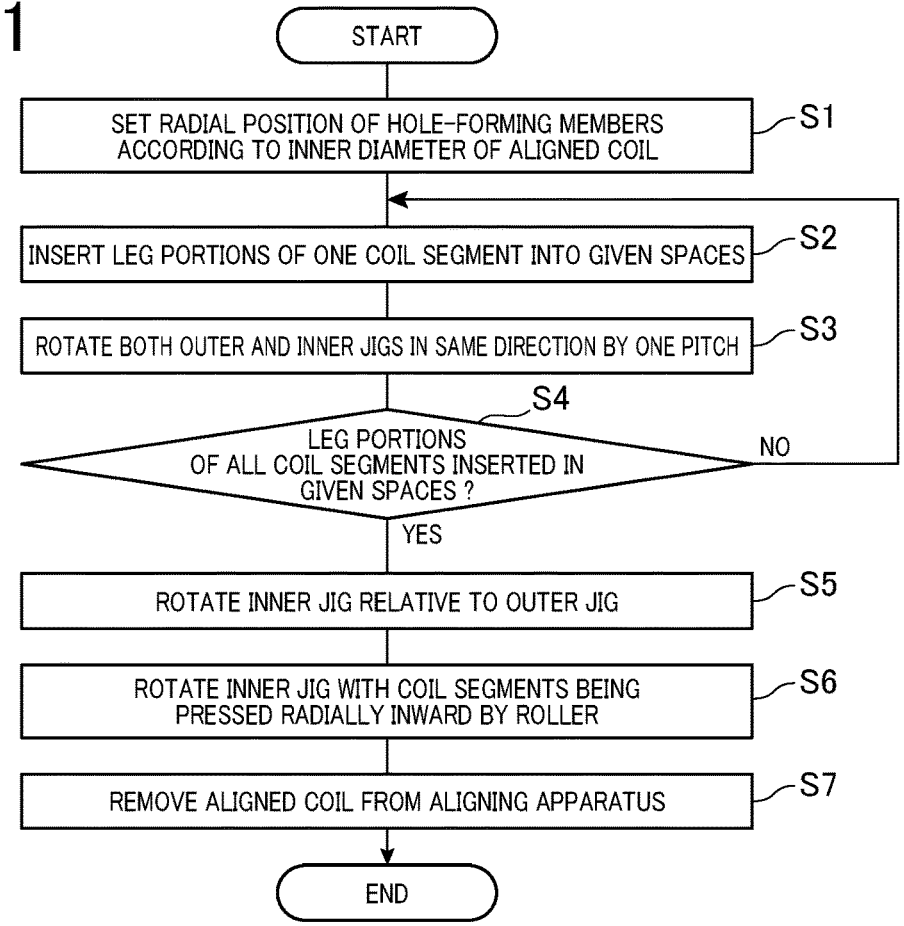
FIG. 21 is a flow chart illustrating a method of manufacturing an aligned coil according to the first embodiment.

Next, a method of manufacturing an aligned coil 2 using the aligning apparatus 1 according to the present embodiment will be described with reference to FIG. 21.

First, in step S1, as shown in FIGS. 8-10, the radial position of the hole-forming members 21 of the inner jig 20 is set according to the inner diameter of the aligned coil 2 to be formed with the aligning apparatus 1. More specifically, the radial position of the holes 22 of the hole-forming members 21 is set by radially moving the hole-forming members 21 to bring the radial position of the holes 22 into agreement with the radial position of the second leg portions 42 of the coil segments 4 for forming the aligned coil 2.

In step S2, as shown in FIGS. 12, 14 and 16, the first and second leg portions 41 and 42 of one of the coil segments 4 are inserted by the insertion mechanism 50 respectively into the given spaces. More specifically, the first leg portion 41 is inserted into the space between one circumferentially-adjacent pair of the partitioning members 11 of the outer jig 10 while the second leg portion 42 is inserted into the void space inside the hole 20 of one of the hole-forming members 21 of the inner jig 20.

In step S3, as shown in FIGS. 13 and 15, both the outer jig 10 and the inner jig 20 are rotated in the same direction by one pitch.

In step S4, a determination is made as to whether all the coil segments 4 forming the aligned coil 2 have their leg portions 41 and 42 inserted in the given spaces.

If the determination in step S4 results in a □NO□answer, the above steps S2 and S3 are repeated for the next coil segment 4.

In contrast, if the determination in step S4 results in a □YES□answer, then in step S5, only the inner jig 20 is rotated with the outer jig 10 kept stationary. That is, the inner jig 20 is rotated relative to the outer jig 10 (see FIG. 18). Consequently, the first leg portions 41 of all the coil segments 4 inserted between the partitioning members 11 of the outer jig 10 are moved radially inward along the partitioning members 11. At the same time, each of the second leg portions 42 of all the coil segments 4, which are inserted respectively in the holes 22 of the hole-forming members 21 of the inner jig 20, rotates about its axis in the respective hole 42.

In step S6, as shown in FIG. 19, the inner jig 20 is rotated with the coil segments 4 being pressed by the roller 60 radially inward (i.e., toward the hole-forming members 21 of the inner jig 20). Consequently, the first leg portions 41 of all the coil segments 4 are caused to approach the hole-forming members 21 of the inner jig 20. As a result, the aligned coil 2 is obtained as shown in FIG. 20.

In step S7, the aligned coil 2 is held by a chuck jig (not shown) and removed from the outer and inner jigs 10 and 20 of the aligning apparatus 1 (see FIG. 1).

In addition, the aligned coil 2 is then combined with other aligned coils 2 having different diameters from the aligned coil 2, and assembled into the slots of the stator core 3.

As described above, the aligning apparatus 1 according to the present embodiment includes the outer jig 10 and the inner jig 20. The outer jig 10 has the partitioning members 11 arranged in the radial fashion. The partitioning members 11 are spaced at such intervals as to allow each of the first leg portions 41 of the coil segments 4 to be inserted between one circumferentially-adjacent pair of the partitioning members 11. The inner jig 20 has the hole-forming members 21 arranged radially inside the partitioning members 11 of the outer jig 10. Each of the hole-forming members 21 has formed therein the hole 22 in which one of the second leg portions 42 of the coil segments 4 is to be inserted. The hole-forming members 21 of the inner jig 20 are configured to be rotatable relative to the outer jig 10 in the circumferential direction and radially movable. With the above configuration of the aligning apparatus 1, it is possible to form aligned coils 2 of various diameters by setting the radial position of the hole-forming members 21 of the inner jig 20 according to the positions where the second leg portions 42 of the coil segments 4 forming one aligned coil 2 are to be respectively located during formation of the aligned coil 2. Consequently, it becomes possible to form all the aligned coils 2 of a given armature (i.e., stator in the present embodiment) using the single machine that includes the aligning apparatus 1. Moreover, it also becomes possible to form, using the same machine, all the aligned coils 2 of another armature having different dimensions from the given armature. As a result, it becomes unnecessary to employ a plurality of dedicated machines for manufacturing aligned coils 2 for use in armatures having different dimensions. Hence, with the above configuration of the aligning apparatus 1, it becomes possible to reduce the cost of manufacturing aligned coils 2 of various diameters.

Moreover, with the manufacturing method according to the present embodiment, it is possible to manufacture aligned coils 2 of various diameters using the aligning apparatus 1 at low cost.

Second Embodiment

An aligning apparatus 1 according to the second embodiment has a similar configuration to the aligning apparatus 1 according to the first embodiment. Therefore, only the differences therebetween will be described hereinafter.

In the aligning apparatus 1 according to the first embodiment, the hole-forming members 21 of the inner jig 20 are configured to be radially movable by the taper member 30 (see FIGS. 8-10).

Figure 22:
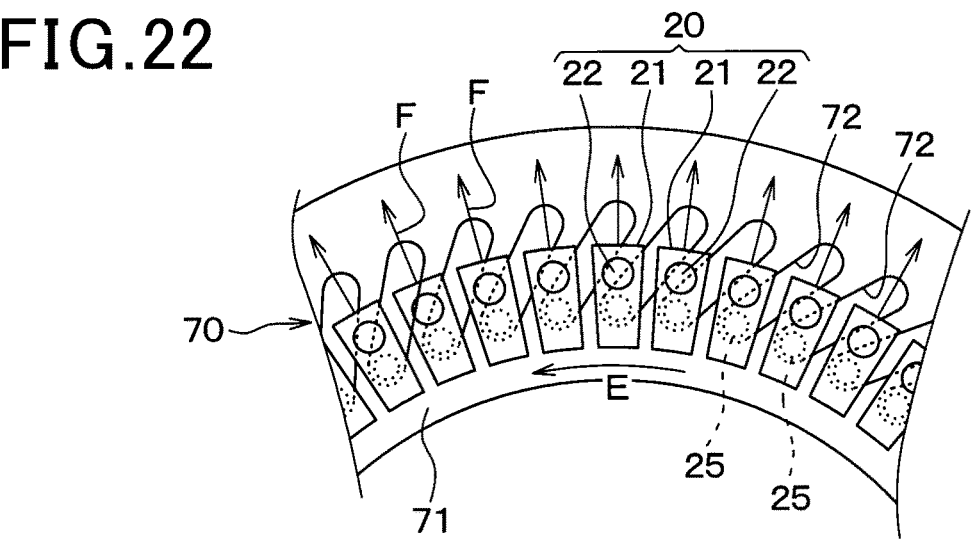
FIG. 22 is an explanatory diagram illustrating the operation of a cam mechanism for changing the radial position of hole-forming members of an inner jig in an aligning apparatus according to a second embodiment.
Figure 23:
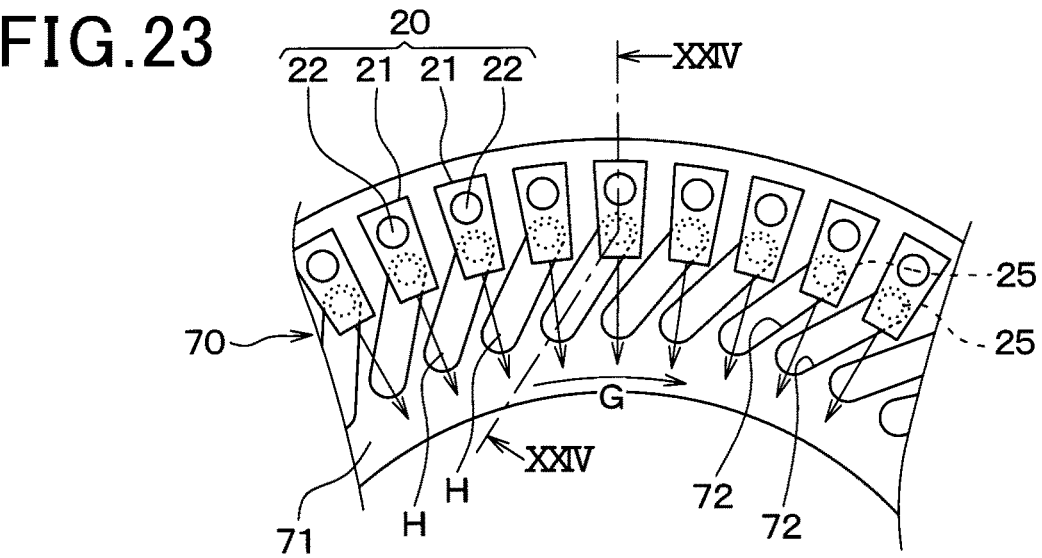
FIG. 23 is another explanatory diagram illustrating the operation of the cam mechanism for changing the radial position of the hole-forming members of the inner jig in the aligning apparatus according to the second embodiment.
Figure 24:
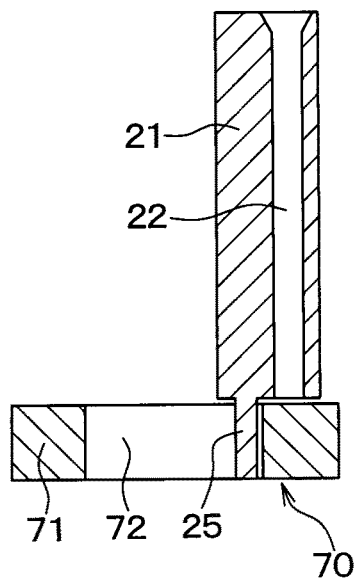
FIG. 24 is a cross-sectional view taken along the line XXIV-XXIV in FIG. 23.

In contrast, in the aligning apparatus 1 according to the present embodiment, the hole-forming members 21 of the inner jig 20 are configured to be radially movable by a cam mechanism 70 as shown in FIGS. 22-24.

Specifically, in the aligning apparatus 1 according to the present embodiment, a rotating disk 71 is provided on one axial side of the inner jig 20. In the rotating disk 71, there are formed a plurality (e.g., 48 in the present embodiment) of cam grooves 72 each of which extends obliquely with respect to a radial direction of the rotating disk 71. On the other hand, each of the hole-forming members 21 of the inner jig 20 has a protrusion 25 formed on an end portion thereof on the rotating disk 71 side. Moreover, the protrusions 25 of the hole-forming members 21 are inserted respectively in the cam grooves 72 of the rotating disk 71.

With the above configuration, upon the rotating disk 71 rotating, from a state as shown in FIG. 22, in a direction indicated with an arrow E, the hole-forming members 21 of the inner jig 20 are moved radially outward as indicated with arrows F, thereby being brought into a state as shown in FIG. 23.

In contrast, upon the rotating disk 71 rotating, from the state as shown in FIG. 23, in a direction indicated with an arrow G, the hole-forming members 21 of the inner jig 20 are moved radially inward as indicated with arrows H, thereby being brought into the state as shown in FIG. 22.

As above, in the aligning apparatus 1 according to the present embodiment, it is possible to set the radial position of the hole-forming members 21 of the inner jig 20 according to the positions where the second leg portions 42 of the coil segments 4 forming one aligned coil 2 are to be respectively located during formation of the aligned coil 2. Consequently, it is possible to achieve the same advantageous effects as described in the first embodiment.

While the above particular embodiments have been shown and described, it will be understood by those skilled in the art that various modifications, changes and improvements may be made without departing from the spirit of the present disclosure.

(1) In the above-described embodiments, the hole-forming members 21 of the inner jig 20 are configured to be radially movable by either the taper member 30 or the cam mechanism 70. As an alternative, the hole-forming members 21 of the inner jig 20 may be configured to be radially movable by, for example, an actuator (not shown).

(2) In the above-described embodiments, in steps S2 and S3 of the method of manufacturing an aligned coil 2, the coil segments 4 are inserted one by one; during the time interval between the insertions of each consecutive pair of the coil segments 4, both the outer jig 10 and the inner jig 20 are rotated in the same direction by one pitch. As an alternative, it is possible to insert two or more coil segments 4 at the same time.

(3) In the above-described embodiments, in step S5 of the method of manufacturing an aligned coil 2, only the inner jig 20 is rotated with the outer jig 10 kept stationary. As an alternative, defining the direction in which the inner jig 20 is rotated in step S5 as a forward direction, it is possible to rotate only the outer jig 10 in a reverse direction with the inner jig 20 kept stationary. As another alternative, it is possible to rotate the inner jig 20 in the forward direction while rotating the outer jig 10 in the reverse direction.

(4) In the above-described embodiments, in step S6 of the method of manufacturing an aligned coil 2, the coil segments 4 are pressed by the roller 60 radially inward with the inner jig 20 rotating. As an alternative, it is possible to press the coil segments 4 radially inward by the roller 60 while rotating the roller 60 along the circumferential direction of the inner jig 20 with the inner jig 20 kept stationary.

(5) In the above-described embodiments, for each of the holes 22 of the hole-forming members 21 of the inner jig 20, the inner diameter of the hole 22 is set so as to allow that one of the second leg portions 42 of the coil segments 4 which is inserted in the hole 22 to rotate about the axis of the second leg portion 42 in the hole 22. As an alternative, it is possible to configure each of the hole-forming members 21 to rotate along with that one of the second leg portions 42 of the coil segments 4 which is inserted in the hole 22 of the hole-forming member 21.

(6) In the above-described embodiments, the armature, to which the aligned coils 2 are assembled, is configured as a stator of a rotating electric machine. As an alternative, the armature may be configured as a rotor of a rotating electric machine.

What is claimed is:

1. An aligning apparatus for aligning a plurality of coil segments in an annular shape to form an aligned coil, each of the coil segments being substantially U-shaped to have a pair of first and second leg portions extending parallel to each other and a connecting portion that connects the first and second leg portions, the aligning apparatus comprising:
- an outer jig having a plurality of partitioning members arranged in a radial fashion, the partitioning members being spaced at such intervals as to allow each of the first leg portions of the coil segments to be inserted between one circumferentially-adjacent pair of the partitioning members; and
- an inner jig having a plurality of hole-forming members arranged radially inside the partitioning members of the outer jig, each of the hole-forming members having formed therein a hole in which one of the second leg portions of the coil segments is to be inserted, wherein
the hole-forming members of the inner jig are configured to be rotatable relative to the outer jig in a circumferential direction and radially movable.

2. The aligning apparatus as set forth in claim 1, wherein for each of the holes of the hole-forming members, an inner diameter of the hole is set so as to allow that one of the second leg portions of the coil segments which is inserted in the hole to rotate about an axis of the second leg portion in the hole.

3. The aligning apparatus as set forth in claim 1, further comprising a pressing member that is configured to press the coil segments, from a position radially inside radially-inner end surfaces of the partitioning members of the outer jig, toward the hole-forming members of the inner jig.

4. The aligning apparatus as set forth in claim 1, wherein the outer jig and the inner jig are configured to be capable of performing:
- a first operation in which both the outer jig and the inner jig rotate in a same direction by a same rotation angle; and
- a second operation in which the outer jig and the inner jig rotate relative to each other.

5. The aligning apparatus as set forth in claim 1, further comprising an insertion mechanism that includes:
- a placing plate on which each of the coil segments is to be placed to have the first leg portion of the coil segment arranged on an imaginary straight line extending between one circumferentially-adjacent pair of the partitioning members of the outer jig and the second leg portion of the coil segment arranged on an imaginary straight line extending through a center of the hole of one of the hole-forming members of the inner jig;
- a pusher configured to push the coil segment placed on the placing plate to have the first leg portion of the coil segment inserted between one circumferentially-adjacent pair of the partitioning members of the outer jig and the second leg portion of the coil segment inserted into the hole of one of the hole-forming members of the inner jig; and
- a coil-segment guide configured to slidably support the second leg portion of the coil segment placed on the placing plate while the pusher pushes the coil segment and to release the second leg portion of the coil segment after at least part of the second leg portion has been inserted into the hole of one of the hole-forming members of the inner jig.

6. The aligning apparatus as set forth in claim 1, further comprising a taper member having a taper surface, the taper surface being formed to have its outer diameter gradually decreasing from a first side to a second side in an axial direction of the inner jig, the taper member being movable in the axial direction, wherein
- each of the hole-forming members of the inner jig has its radially inner surface formed as an inclined surface that is inclined from a radially outer side to a radially inner side while extending from the first side to the second side in the axial direction of the inner jig, and
- the aligning apparatus is configured so that with movement of the taper member in the axial direction, the taper surface of the taper member makes sliding contact with the inclined surfaces of the hole-forming members of the inner jig, causing the hole-forming members to be radially moved.

7. A method of manufacturing an aligned coil by aligning a plurality of coil segments in an annular shape, each of the coil segments being substantially U-shaped to have a pair of first and second leg portions extending parallel to each other and a connecting portion that connects the first and second leg portions, the method being executed using an aligning apparatus comprising:
- an outer jig having a plurality of partitioning members arranged in a radial fashion, the partitioning members being spaced at such intervals as to allow each of the first leg portions of the coil segments to be inserted between one circumferentially-adjacent pair of the partitioning members; and
- an inner jig having a plurality of hole-forming members arranged radially inside the partitioning members of the outer jig, each of the hole-forming members having formed therein a hole in which one of the second leg portions of the coil segments is to be inserted, the hole-forming members of the inner jig being configured to be rotatable relative to the outer jig in a circumferential direction and radially movable, and the method comprising:
- a step of setting a radial position of the hole-forming members of the inner jig by radially moving the hole-forming members to positions where the second leg portions of the coil segments are to be respectively located during formation of the aligned coil;
- a step of inserting the first and second leg portions of one of the coil segments respectively into a space between one circumferentially-adjacent pair of the partitioning members of the outer jig and the hole of one of the hole-forming members of the inner jig;
- a step of rotating both the outer jig and the inner jig in a same direction by a same rotation angle;
- a step of rotating, after performing the inserting step and the preceding rotating step for all the coil segments, the outer jig and the inner jig relative to each other, causing the first leg portions of the coil segments inserted between the partitioning members of the outer jig to be moved radially inward along the partitioning members; and
- a step of pressing, after the first leg portions of the coil segments have been moved to a radially inner side of the partitioning members of the outer jig, the coil segments to cause the first leg portions of the coil segments to approach the hole-forming members of the inner jig, thereby aligning the coil segments in an annular shape to form the aligned coil.

* * * * *